No. 673,436. Patented May 7, 1901.
M. KENNEY.
FISH BAKER.
(Application filed July 14, 1900.)
(No Model.)

WITNESSES,

INVENTOR,
Maggie Kenney

UNITED STATES PATENT OFFICE.

MAGGIE KENNEY, OF EAST PROVIDENCE, RHODE ISLAND.

FISH-BAKER.

SPECIFICATION forming part of Letters Patent No. 673,436, dated May 7, 1901.

Application filed July 14, 1900. Serial No. 23,694. (No model.)

*To all whom it may concern:*

Be it known that I, MAGGIE KENNEY, a citizen of the United States, residing in East Providence, county of Providence, and State of Rhode Island, have invented a new and useful Fish-Baker, of which the following is a specification.

My invention relates to improvements in fish-bakers, or a device on which to bake fish; and the objects of my improvements are, first, to provide supports on which to place the fish while baking and which are so arranged as to be removed from under the fish when baked, so as not to break or disarrange or separate its parts; second, to produce a baker easily, effectively, and quickly operated, and, third, to make a durable baker at low cost. I attain these objects by the mechanism illustrated in the accompanying drawings, in which—

Figure 1:
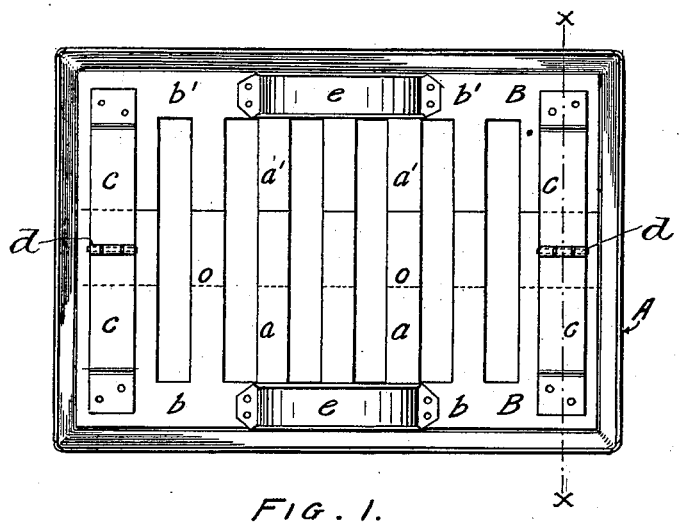
Figure 2:
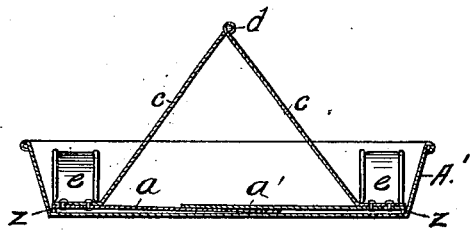
Figure 3:
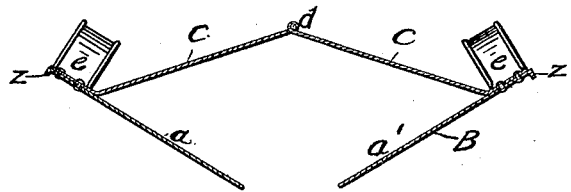

Figure 1 represents a plan view of an ordinary baking-pan and my fish-baker in position for baking in said pan. Fig. 2 represents a cross-section of a pan and my fish-baker from $x$ to $x$, as shown in dotted lines, Fig. 1. Fig. 3 represents a cross-section of my fish-baker from $x$ to $x$ on Fig. 1.

Similar letters refer to similar parts throughout all the views.

A represents an ordinary baking-pan.

B represents my fish-baker.

A' represents a cross-section of the pan and the fish-baker on dotted lines $x$ $x$, Fig. 1.

The bottom part of my baker is made in two parts $b$ $b'$, $b$ having arms $a$, extending two-thirds across the baker, and $b'$ having arms $a'$, extending two-thirds across the baker, the arms $a'$ running under the arms $a$ to the dotted lines $o$. The parts $b$ and $b'$ are connected at each end of the baker by arms $c$ $c$, which are united and work on hinge-joints $d$. The two sides $b$ and $b'$ have handles $e$ $e$, by which the baker is removed from the pan and the baker opened to release the fish. Legs may be formed under the outer edges of $b$ and $b'$ to raise the baker from the pan by re-turning the outer edges of $b$ and $b'$, as at $z$ $z$, or by forming legs for this purpose in any of the ways well known to mechanics in the art.

In operating my device I place the fish to be baked on the arms $a$ $a'$ of the baker. After baking I remove the baker and fish from the pan together and then carry them over the platter onto which it is to be placed, when I lift the handles $e$ $e$, which in turn draws the arms $a$ $a'$ from under the fish, leaving it on the platter whole and ready for garnishment and service.

I claim—

In a fish-baker the combination of two parallel sections, of arms rigidly secured to each section and disposed at an angle thereto, the arms of one section being hinged to those of the other section, and a handle secured to each by which the sections may be moved toward or from each other, said sections being adapted to overlap when in their operative position.

MAGGIE KENNEY.

Witnesses:
H. W. BOARDMAN,
S. D. KEENE.